United States Patent
Lakshman et al.

(10) Patent No.: US 11,916,886 B2
(45) Date of Patent: **\*Feb. 27, 2024**

(54) IN-FLIGHT DATA ENCRYPTION/DECRYPTION FOR A DISTRIBUTED STORAGE PLATFORM

(71) Applicant: Commvault Systems, Inc., Tinton Falls, NJ (US)

(72) Inventors: Avinash Lakshman, Fremont, CA (US); Swathi Hrishikesh, San Jose, CA (US)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/941,929

(22) Filed: Sep. 9, 2022

(65) Prior Publication Data

US 2023/0014437 A1   Jan. 19, 2023

Related U.S. Application Data

(63) Continuation of application No. 17/066,316, filed on Oct. 8, 2020, now Pat. No. 11,470,056, which is a
(Continued)

(51) Int. Cl.
*H04L 9/40* (2022.01)
*G06F 9/455* (2018.01)
*H04L 67/1097* (2022.01)

(52) U.S. Cl.
CPC ...... *H04L 63/0428* (2013.01); *G06F 9/45558* (2013.01); *H04L 63/062* (2013.01); *H04L 67/1097* (2013.01)

(58) Field of Classification Search
CPC . G06F 21/602; G06F 9/45533; H04L 9/0819; H04L 9/0894; H04L 9/3213
See application file for complete search history.

(56) References Cited

U.S. PATENT DOCUMENTS 4,084,231 A   4/1978   Capozzi et al.
4,267,568 A   5/1981   Dechant et al.
(Continued)

FOREIGN PATENT DOCUMENTS

EP   0259912   3/1988
EP   0405926   1/1991
(Continued)

OTHER PUBLICATIONS

Arneson, "Mass Storage Archiving in Network Environments" IEEE, Oct. 31-Nov. 1998, pp. 45-50.
(Continued)

*Primary Examiner* — Olugbenga O Idowu
(74) *Attorney, Agent, or Firm* — Commvault Systems, Inc.

(57) ABSTRACT

Encryption of data occurs before it is written to the storage platform; decryption occurs after it is read from the storage platform on a computer separate from the storage platform. By encrypting data before it travels over a wide-area network to a storage platform (and by only decrypting that data once it has arrived at an enterprise from the storage platform), we address data security over the network. Application data is encrypted at the virtual disk level before it leaves a controller virtual machine, and is only decrypted at that controller virtual machine after being received from the storage platform. Encryption and decryption of data is compatible with other services of the storage system such as de-duplication. Any number of key management services can be used in a transparent manner.

20 Claims, 11 Drawing Sheets

Related U.S. Application Data continuation of application No. 15/912,374, filed on Mar. 5, 2018, now Pat. No. 10,848,468.

(56)     References Cited

U.S. PATENT DOCUMENTS

| | | |
|---|---|---|
| 4,283,787 A | 8/1981 | Chambers |
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,347,653 A | 9/1994 | Flynn et al. |
| 5,410,700 A | 4/1995 | Fecteau et al. |
| 5,420,996 A | 5/1995 | Aoyagi |
| 5,454,099 A | 9/1995 | Myers et al. |
| 5,559,991 A | 9/1996 | Kanfi |
| 5,642,496 A | 6/1997 | Kanfi |
| 6,418,478 B1 | 7/2002 | Ignatius et al. |
| 6,473,774 B1 | 10/2002 | Cellis et al. |
| 6,542,972 B2 | 4/2003 | Ignatius et al. |
| 6,658,436 B2 | 12/2003 | Oshinsky et al. |
| 6,721,767 B2 | 4/2004 | De Meno et al. |
| 6,760,723 B2 | 7/2004 | Oshinsky et al. |
| 7,003,641 B2 | 2/2006 | Prahlad et al. |
| 7,035,880 B1 | 4/2006 | Crescenti et al. |
| 7,076,509 B1 | 7/2006 | Chen |
| 7,107,298 B2 | 9/2006 | Prahlad et al. |
| 7,130,970 B2 | 10/2006 | Devassy et al. |
| 7,162,496 B2 | 1/2007 | Amarendran et al. |
| 7,174,433 B2 | 2/2007 | Kottomtharayil et al. |
| 7,246,207 B2 | 7/2007 | Kottomtharayil et al. |
| 7,315,923 B2 | 1/2008 | Retnamma et al. |
| 7,343,453 B2 | 3/2008 | Prahlad et al. |
| 7,373,451 B2 | 5/2008 | Lam |
| 7,389,311 B1 | 6/2008 | Crescenti et al. |
| 7,395,282 B1 | 7/2008 | Crescenti et al. |
| 7,440,982 B2 | 10/2008 | Lu et al. |
| 7,454,569 B2 | 11/2008 | Kavuri et al. |
| 7,490,207 B2 | 2/2009 | Amarendran et al. |
| 7,500,053 B1 | 3/2009 | Kavuri et al. |
| 7,529,782 B2 | 5/2009 | Prahlad et al. |
| 7,536,291 B1 | 5/2009 | Vijayan Retnamma et al. |
| 7,543,125 B2 | 6/2009 | Gokhale |
| 7,546,324 B2 | 6/2009 | Prahlad et al. |
| 7,587,715 B1 | 9/2009 | Barrett |
| 7,603,386 B2 | 10/2009 | Amarendran et al. |
| 7,606,844 B2 | 10/2009 | Kottomtharayil |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,620,710 B2 | 11/2009 | Kottomtharayil et al. |
| 7,636,743 B2 | 12/2009 | Erofeev |
| 7,651,593 B2 | 1/2010 | Prahlad et al. |
| 7,653,669 B2 | 1/2010 | Kapoor |
| 7,657,550 B2 | 2/2010 | Prahlad et al. |
| 7,660,807 B2 | 2/2010 | Prahlad et al. |
| 7,661,028 B2 | 2/2010 | Erofeev |
| 7,734,669 B2 | 6/2010 | Kottomtharayil et al. |
| 7,747,579 B2 | 6/2010 | Prahlad et al. |
| 7,801,864 B2 | 9/2010 | Prahlad et al. |
| 7,809,914 B2 | 10/2010 | Kottomtharayil et al. |
| 7,925,624 B2 | 4/2011 | Vosshall |
| 8,001,322 B2 | 8/2011 | Lecomte |
| 8,041,888 B2 | 10/2011 | Rajan |
| 8,156,086 B2 | 4/2012 | Lu et al. |
| 8,170,995 B2 | 5/2012 | Prahlad et al. |
| 8,229,954 B2 | 7/2012 | Kottomtharayil et al. |
| 8,230,195 B2 | 7/2012 | Amarendran et al. |
| 8,260,751 B2 | 9/2012 | Johnson |
| 8,285,681 B2 | 10/2012 | Prahlad et al. |
| 8,307,177 B2 | 11/2012 | Prahlad et al. |
| 8,312,046 B1 | 11/2012 | Eisler |
| 8,364,639 B1 | 1/2013 | Koryakina |
| 8,364,652 B2 | 1/2013 | Vijayan et al. |
| 8,370,542 B2 | 2/2013 | Lu et al. |
| 8,386,838 B1 | 2/2013 | Bryan |
| 8,413,142 B2 | 4/2013 | Sharp |
| 8,453,145 B1 | 5/2013 | Naik |
| 8,458,422 B1 | 6/2013 | Holdman |
| 8,578,120 B2 | 11/2013 | Attarde et al. |
| 8,601,473 B1 | 12/2013 | Aron |
| 8,649,276 B2 | 2/2014 | O'Shea |
| 8,762,430 B1 | 6/2014 | Hall |
| 8,850,130 B1 | 9/2014 | Aron |
| 8,861,527 B1 | 10/2014 | Bao |
| 8,874,842 B1 | 10/2014 | Kimmel |
| 8,892,549 B1 | 11/2014 | Thakur |
| 8,954,446 B2 | 2/2015 | Vijayan Retnamma et al. |
| 9,009,106 B1 | 4/2015 | Aron |
| 9,020,900 B2 | 4/2015 | Vijayan Retnamma et al. |
| 9,053,339 B2 | 6/2015 | Pate |
| 9,098,495 B2 | 8/2015 | Gokhale |
| 9,239,687 B2 | 1/2016 | Vijayan et al. |
| 9,298,723 B1 | 3/2016 | Vincent |
| 9,342,253 B1 | 5/2016 | Muthukkaruppan |
| 9,411,534 B2 | 8/2016 | Lakshman et al. |
| 9,424,058 B1 | 8/2016 | Wasson et al. |
| 9,424,133 B2 | 8/2016 | Schindler |
| 9,424,151 B2 | 8/2016 | Lakshman et al. |
| 9,483,205 B2 | 11/2016 | Lakshman et al. |
| 9,558,085 B2 | 1/2017 | Lakshman |
| 9,633,033 B2 | 4/2017 | Vijayan et al. |
| 9,639,274 B2 | 5/2017 | Maranna et al. |
| 9,652,265 B1 | 5/2017 | Narayanasamy |
| 9,798,489 B2 | 10/2017 | Lakshman et al. |
| 9,864,530 B2 | 1/2018 | Lakshman |
| 9,875,063 B2 | 1/2018 | Lakshman |
| 10,067,722 B2 | 9/2018 | Lakshman |
| 10,248,174 B2 | 4/2019 | Lakshman et al. |
| 10,404,674 B1* | 9/2019 | Bshara ............. H04L 9/0894 |
| 10,740,300 B1 | 8/2020 | Lakshman et al. |
| 10,848,468 B1 | 11/2020 | Lakshman et al. |
| 2002/0019908 A1 | 2/2002 | Reuter |
| 2002/0133669 A1 | 9/2002 | Devireddy |
| 2003/0145167 A1 | 7/2003 | Tomita |
| 2003/0182494 A1 | 9/2003 | Rodrigues |
| 2004/0098373 A1 | 5/2004 | Bayliss |
| 2004/0250033 A1 | 12/2004 | Prahlad |
| 2005/0044356 A1 | 2/2005 | Srivastava et al. |
| 2005/0108292 A1 | 5/2005 | Burton |
| 2005/0246393 A1 | 11/2005 | Coates |
| 2005/0246397 A1 | 11/2005 | Edwards |
| 2006/0168402 A1 | 7/2006 | Ahmad |
| 2006/0224846 A1 | 10/2006 | Amarendran et al. |
| 2007/0038888 A1 | 2/2007 | Kariv |
| 2007/0106706 A1 | 5/2007 | Ahrens |
| 2008/0183973 A1 | 7/2008 | Aguilera |
| 2008/0244028 A1 | 10/2008 | Le |
| 2009/0055427 A1 | 2/2009 | Kulasingam |
| 2009/0210875 A1 | 8/2009 | Bolles |
| 2009/0217265 A1 | 8/2009 | Ishikawa |
| 2009/0282404 A1 | 11/2009 | Khandekar |
| 2009/0319534 A1 | 12/2009 | Gokhale |
| 2010/0058013 A1 | 3/2010 | Gelson et al. |
| 2010/0161657 A1 | 6/2010 | Cha |
| 2010/0199126 A1 | 8/2010 | Noguchi |
| 2010/0223368 A1 | 9/2010 | Runcie |
| 2010/0257403 A1 | 10/2010 | Virk |
| 2011/0099154 A1 | 4/2011 | Maydew |

(56) References Cited

U.S. PATENT DOCUMENTS

| | | |
|---|---|---|
| 2011/0185355 A1 | 7/2011 | Chawla |
| 2011/0191834 A1 | 8/2011 | Singh |
| 2011/0246984 A1 | 10/2011 | Sharp |
| 2011/0265083 A1 | 10/2011 | Davis |
| 2012/0110328 A1 | 5/2012 | Pate |
| 2012/0150818 A1 | 6/2012 | Vijayan Retnamma et al. |
| 2012/0150826 A1 | 6/2012 | Vijayan Retnamma et al. |
| 2012/0323853 A1 | 12/2012 | Fries |
| 2013/0007183 A1 | 1/2013 | Sorenson, III |
| 2013/0086018 A1 | 4/2013 | Horii |
| 2013/0111471 A1 | 5/2013 | Chandrasekaran |
| 2013/0117337 A1 | 5/2013 | Dunham |
| 2013/0191577 A1 | 7/2013 | Thomas |
| 2013/0227552 A1 | 8/2013 | Reddin et al. |
| 2013/0239106 A1 | 9/2013 | Srinivasan |
| 2013/0262387 A1 | 10/2013 | Varadharajan |
| 2013/0262390 A1 | 10/2013 | Kumarasamy |
| 2013/0263114 A1 | 10/2013 | Watkins |
| 2013/0326053 A1 | 12/2013 | Bauer |
| 2013/0339407 A1 | 12/2013 | Sharpe et al. |
| 2013/0346709 A1 | 12/2013 | Wang et al. |
| 2014/0059292 A1 | 2/2014 | Phelan |
| 2014/0059375 A1 | 2/2014 | McElhoe |
| 2014/0156925 A1 | 6/2014 | Baron |
| 2014/0173181 A1 | 6/2014 | Beveridge |
| 2014/0181397 A1 | 6/2014 | Bonzini |
| 2014/0188825 A1 | 7/2014 | Muthukkaruppan |
| 2014/0201170 A1 | 7/2014 | Vijayan et al. |
| 2014/0282509 A1 | 9/2014 | Zheng |
| 2014/0317618 A1 | 10/2014 | Behera |
| 2014/0324793 A1 | 10/2014 | Glazemakers |
| 2014/0344809 A1 | 11/2014 | Jin |
| 2014/0365549 A1 | 12/2014 | Jenkins |
| 2014/0379983 A1 | 12/2014 | Sasaki |
| 2015/0074662 A1 | 3/2015 | Saladi |
| 2015/0088586 A1 | 3/2015 | Pavlas |
| 2015/0127658 A1 | 5/2015 | Ding et al. |
| 2015/0134616 A1 | 5/2015 | Zheng |
| 2015/0227535 A1 | 8/2015 | Avati et al. |
| 2015/0370495 A1 | 12/2015 | Georgiev |
| 2016/0142249 A1 | 5/2016 | Wu |
| 2016/0202916 A1 | 7/2016 | Cui |
| 2016/0350302 A1 | 12/2016 | Lakshman |
| 2016/0350391 A1 | 12/2016 | Vijayan et al. |
| 2016/0371104 A1 | 12/2016 | Zamir |
| 2017/0032012 A1 | 2/2017 | Zhang et al. |
| 2017/0168903 A1 | 6/2017 | Dornemann et al. |
| 2017/0185488 A1 | 6/2017 | Kumarasamy et al. |
| 2017/0192866 A1 | 7/2017 | Vijayan et al. |
| 2017/0193003 A1 | 7/2017 | Vijayan et al. |
| 2017/0235647 A1 | 8/2017 | Kilaru et al. |
| 2017/0242871 A1 | 8/2017 | Kilaru et al. |
| 2017/0329527 A1 | 11/2017 | Lakshman et al. |
| 2017/0329530 A1 | 11/2017 | Lakshman et al. |
| 2018/0091294 A1* | 3/2018 | Iyer .................. H04L 9/0891 |
| 2018/0139188 A1 | 5/2018 | Iyer et al. |
| 2018/0314726 A1 | 11/2018 | Bath et al. |
| 2019/0171264 A1 | 6/2019 | Lakshman et al. |
| 2021/0029095 A1 | 1/2021 | Lakshman et al. |

FOREIGN PATENT DOCUMENTS

| | | |
|---|---|---|
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| WO | WO 95/13580 | 5/1995 |
| WO | WO 99/12098 | 3/1999 |
| WO | WO 2006/052872 | 5/2006 |
| WO | WO 2014/008495 | 1/2014 |

OTHER PUBLICATIONS

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," IEEE, 1994, pp. 124-126.

Huff, KL, "Data Set Usage Sequence Number," IBM Technical Disclosure Bulletin, vol. 24, No. 5, Oct. 1981 New York, US, pp. 2404-2406.

Lakshman et al., "Cassandra—A Decentralized Structured Storage System", https://doi.org/10.1145/1773912.1773922, ACM SIGOPS Operating Systems Review, Volum 44, Issue 2, Apr. 2010, pp. 35-40.

Swiftstack, Inc., "The OpenStack Object Storage System," Feb. 2012, pp. 1-29.

Rosenblum et al., "The Design and Implementation of a Log-Structure File System," Operating Systems Review SIGOPS, vol. 25, No. 5, May 1991, New York, US, pp. 1-15.

International Search Report dated Jan. 13, 2016 from International Application No. PCT/US2015/038687.

Written Opinion dated Jan. 13, 2016 from International Application No. PCT/US2015/038687.

* cited by examiner

IN-FLIGHT DATA ENCRYPTION/DECRYPTION FOR A DISTRIBUTED STORAGE PLATFORM

CROSS-REFERENCE TO RELATED APPLICATIONS

This application is a Continuation of U.S. patent application Ser. No. 17/066,316 filed on Oct. 8, 2020, which is a Continuation of U.S. patent application Ser. No. 15/912,374 filed on Mar. 5, 2018 (now U.S. Pat. No. 10,848,468), which is hereby incorporated by reference in its entirety herein. This application is also related to U.S. patent application Ser. Nos. 14/322,813, 14/322,832, 14/684,086, 14/322,850, 14/322,855, 14/322,867, 14/322,868, 14/322,871, 14/723,380, 15/163,446, 15/155,838, 15/156,015, and 15/834,921, which are all hereby incorporated by reference.

FIELD OF THE INVENTION

The present invention relates generally to data encryption. More specifically, the present invention relates to encryption of data before being sent to a storage platform and after being received from a storage platform.

BACKGROUND OF THE INVENTION

In the field of data storage, enterprises have used a variety of techniques in order to store the data that their software applications use. At one point in time, each individual computer server within an enterprise running a particular software application (such as a database or e-mail application) would store data from that application in any number of attached local disks. Although this technique was relatively straightforward, it led to storage manageability problems in that the data was stored in many different places throughout the enterprise.

These problems led to the introduction of the storage area network in which each computer server within an enterprise communicated with a central storage computer node that included all of the storage disks. The application data that used to be stored locally at each computer server was now stored centrally on the central storage node via a fiber channel switch, for example. Although such a storage area network was easier to manage, changes in computer server architecture created new problems.

With the advent of virtualization, each computer server can now host dozens of software applications through the use of a hypervisor on each computer server and the use of virtual machines. Thus, computer servers which had been underutilized can now host many different server applications, each application needing to store its data within the storage area network.

Application data being stored at a remote storage area network or at a remote storage platform (outside of an enterprise) means that data privacy should be addressed. Many prior art techniques use "data-at rest" encryption, meaning that application data is encrypted where it is stored on a storage platform. Although useful, this technique has disadvantages and further improvements in this field are desired.

SUMMARY OF THE INVENTION

To achieve the foregoing, and in accordance with the purpose of the present invention, techniques are disclosed that provide the advantages discussed below.

The present invention provides encryption of data before it is written to the storage platform (and decryption of data after it is read from the storage platform) on a computer separate from the storage platform. Application data is at risk of eavesdropping once it leaves a compute farm, enterprise computer server, virtual machine, etc., on its way to a storage platform; data-at rest encryption techniques do not address this problem. By encrypting data before it travels over a wide-area network to a storage platform (and by only decrypting that data once it has arrived at an enterprise from the storage platform), the present invention addresses data security over the network. In one specific embodiment, application data is encrypted at the virtual disk level before it leaves a controller virtual machine, and is only decrypted at that controller virtual machine after being received from the storage platform.

In addition, encryption and decryption of data is compatible with other services of the storage system such as de-duplication (e.g., after de-duplication the data to be written is encrypted, and once the data is read from the platform or cache it is decrypted). In addition, the invention is scalable and allows for any number of key management services to be used in a transparent manner.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Storage System

Figure 1:
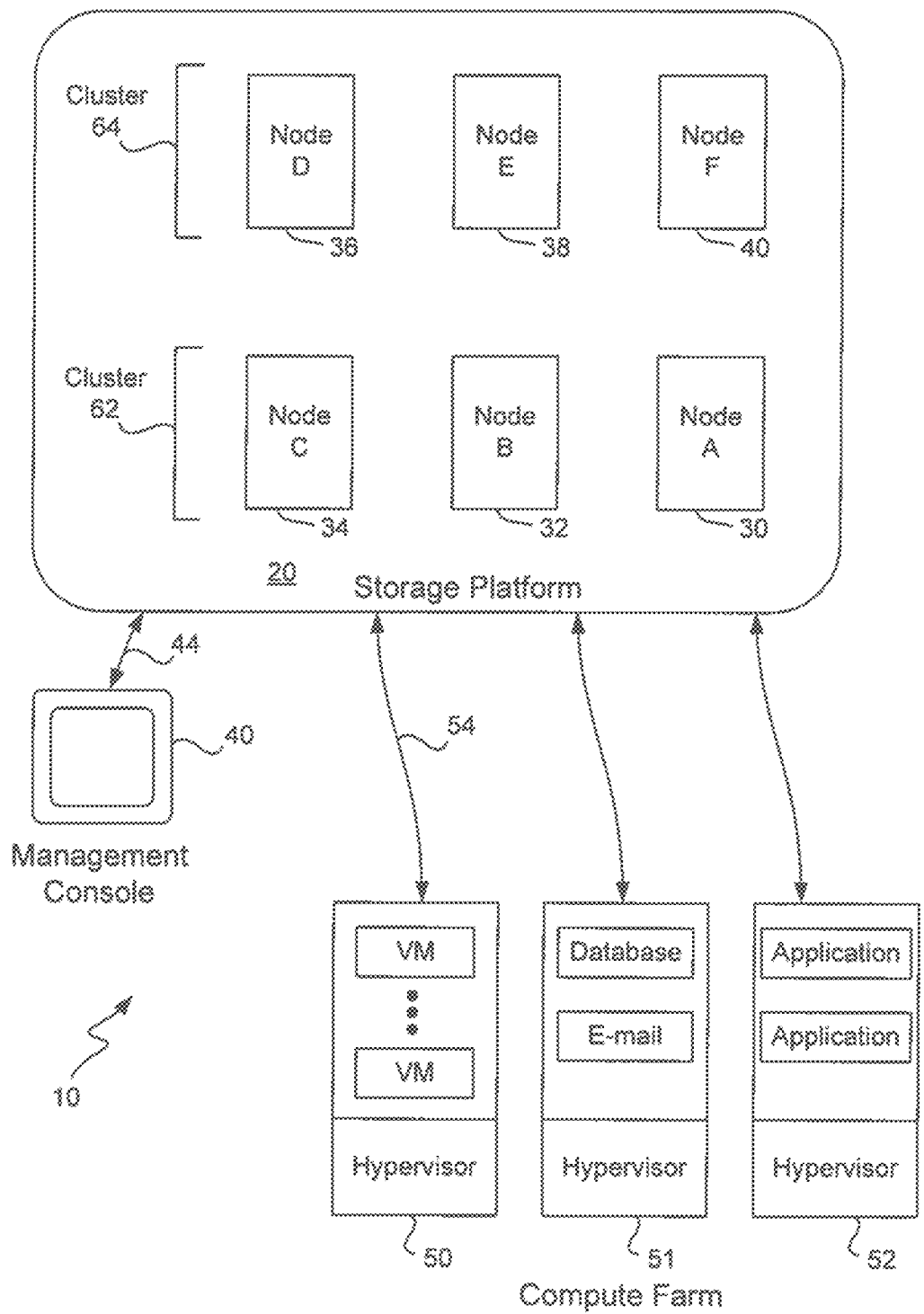
FIG. 1 illustrates a data storage system having a storage platform according to one embodiment of the invention.

FIG. 1 illustrates a data storage system 10 according to one embodiment of the invention having a storage platform 20. Included within the storage platform 20 are any number of computer nodes 30-40. Each computer node of the storage platform has a unique identifier (e.g., "A") that uniquely identifies that computer node within the storage platform. Each computer node is a computer having any number of hard drives and solid-state drives (e.g., flash drives), and in one embodiment includes about twenty disks of about 1 TB each. A typical storage platform may include on the order of about 81 TB and may include any number of computer nodes. One advantage is that a platform may start with as few as three nodes and then grow incrementally to as large as 1,000 nodes or more.

Computers nodes 30-40 are shown logically being grouped together, although they may be spread across data centers and may be in different geographic locations. A management console 40 used for provisioning virtual disks within the storage platform communicates with the platform over a link 44. Any number of remotely-located computer servers 50-52 each typically executes a hypervisor in order to host any number of virtual machines. Server computers 50-52 form what is typically referred to as a compute farm, and although such a compute farm may belong to a single company, it is contemplated that any number of such computer servers or compute farms will be storing data within storage platform 20, and that these computer servers may represent many different companies and enterprises.

As shown, these virtual machines may be implementing any of a variety of applications such as a database server, an e-mail server, etc., including applications from companies such as Oracle, Microsoft, etc. These applications write to and read data from the storage platform using a suitable storage protocol such as iSCSI or NFS, although each application will not be aware that data is being transferred over link 54 using a different protocol.

Management console 40 is any suitable computer or computers able to communicate over an Internet connection or link 44 with storage platform 20. When an administrator of a particular enterprise wishes to manage the storage platform (e.g., provisioning a virtual disk, snapshots, revert, clone, analyze metrics, determine health of cluster, etc.) he or she uses the management console to access the storage platform and is put in communication with a management console routine executing as part of metadata module 130 on any one of the computer nodes within the platform. The management console routine is typically a Web server application.

In order to provision a new virtual disk within storage platform 20 for a particular application running on a virtual machine, the virtual disk is first created and then attached to a particular virtual machine. In order to create a virtual disk, a user uses the management console to first select the size of the virtual disk (e.g., 100 GB), and then selects the individual policies that will apply to that virtual disk. For example, the user selects a replication factor, a data center aware policy, whether de-duplication is enabled, whether encryption should be used, and other policies concerning whether or not to compress the data, the type of disk storage, etc. Once the virtual disk has been created, it is then attached to a particular virtual machine within one of the computer servers 50-52 and the provisioning process is complete.

Advantageously, storage platform 20 is able to simulate prior art central storage nodes (such as the VMax and Clarion products from EMC, VMWare products, etc.) and the virtual machines and application servers will be unaware that they are communicating with storage platform 20 instead of a prior art central storage node. In addition, the provisioning process can be completed on the order of minutes or less, rather than in four to eight weeks as was typical with prior art techniques. The advantage is that one only need to add metadata concerning a new virtual disk in order to provision the disk and have the disk ready to perform writes and reads. No allocation of actual physical storage is needed. Thus, storage system 10 may be utilized by any number of companies, clients, enterprises etc., each of whom creates any number virtual disks to be stored within storage platform 20.

Figure 2:
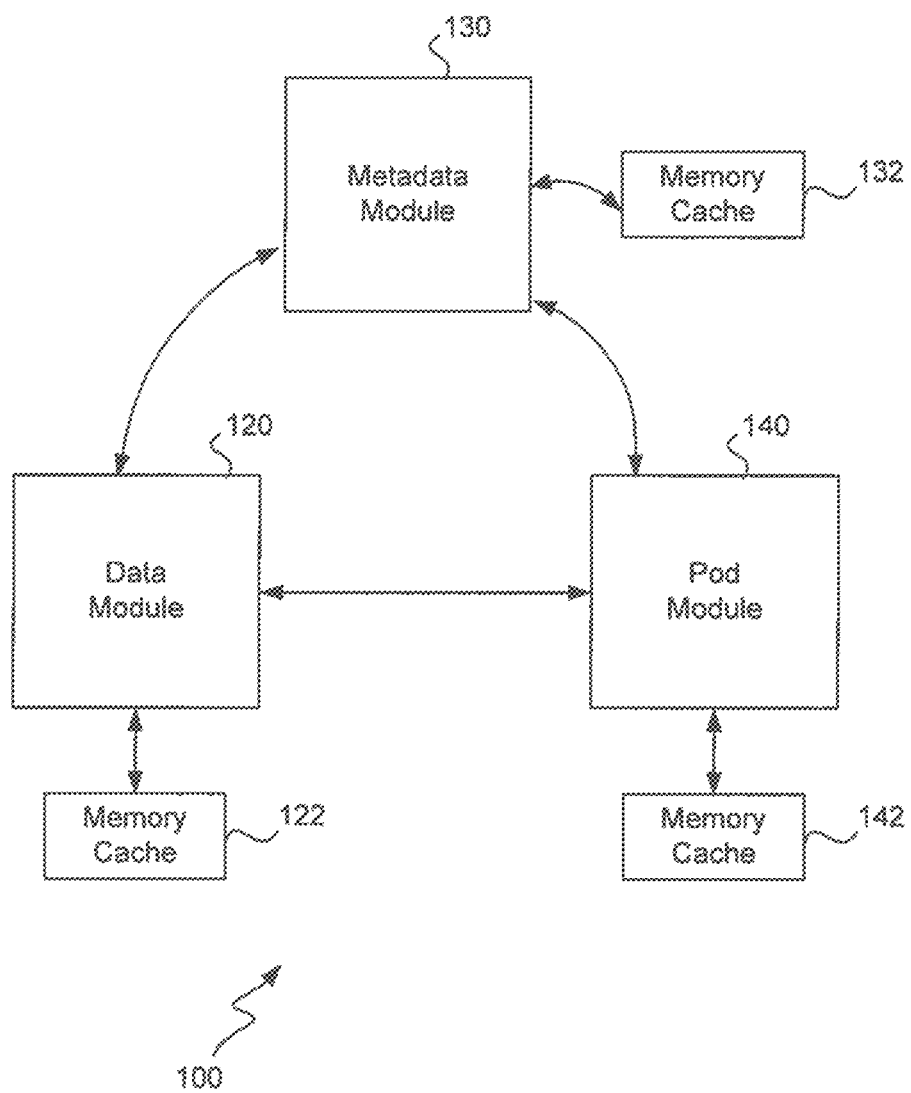
FIG. 2 illustrates software modules used within the storage platform.

FIG. 2 illustrates software modules used within storage system 10. Shown is a data module 120, a metadata module 130 and a pod module 140. Data module handles the storage of data (such as blocks of data, files, objects, etc.) onto individual computer nodes 30-40. Metadata module handles the storage of metadata within the platform, that is, data that helps describe the data, and executes a management console routine to assist in provisioning a virtual disk. Metadata includes all of the virtual disk information described below in FIG. 4, for example. Pod module is a coordinator module and also stores transaction states.

Although shown as three modules, each of the modules runs independently on each of the computer nodes within the platform 20. Also, associated with each module on each node is a memory cache 122, 132 and 142 that stores information used by that module; each module on each computer node may also use persistent storage on that node. A file (for example) that is stored on nodes 32, 34 and 36 (FIG. 1), is referred to as being stored on its "data nodes 32, 34 and 36." The metadata for that file may be stored on three different nodes, and those nodes for that file are referred to as the "metadata nodes 30, 36 and 38." The data nodes and metadata nodes for a particular stored file may be the same or may be different. The modules communicate with each other via a modified version of Gossip over TCP, and work in concert to manage the storage platform.

Controller Virtual Machine

Figure 3:
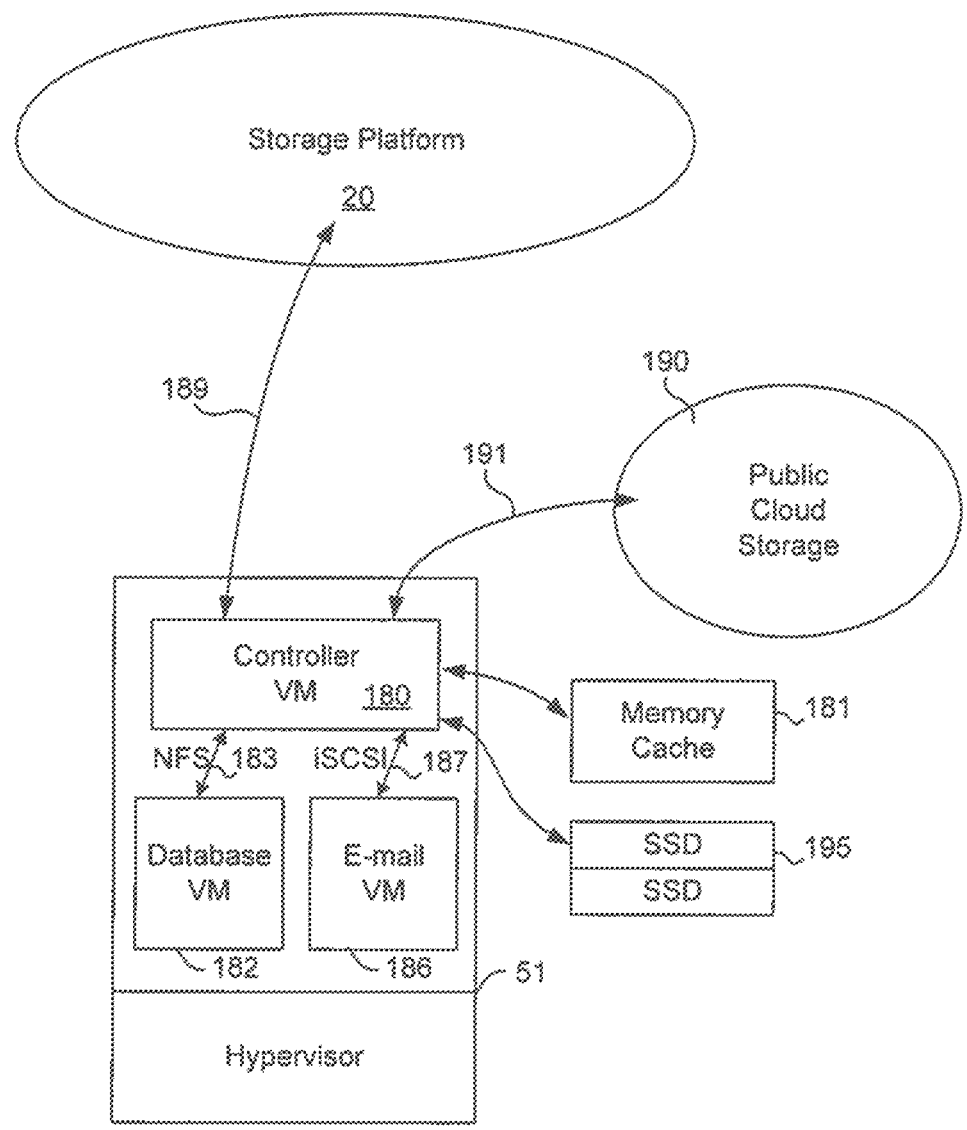
FIG. 3 illustrates in greater detail a computer server in communication with the storage platform.

FIG. 3 illustrates in greater detail one of the computer servers 51 in communication with storage platform 20. As mentioned above, each computer server may host any number of virtual machines, each executing a particular software application. The application may perform I/O handling using a block-based protocol such as iSCSI, using a file-based protocol such as NFS, and the virtual machine communicates using this protocol. Of course, other suitable protocols may also be used by an application. The actual communication protocol used between the server and platform is transparent to these virtual machines.

As shown, server 51 includes a hypervisor and virtual machines 182 and 186 that desire to perform I/O handling using the iSCSI protocol 187 or the NFS protocol 183. Server 51 also includes a specialized controller virtual machine (CVM) 180 that is adapted to handle communications with the virtual machines using either protocol (and others), yet communicates with the storage platform using a proprietary protocol 189. Protocol 189 may be any suitable protocol for passing data between storage platform 20 and a remote computer server 51 such as TCP. In addition, the CVM may also communicate with public cloud storage using the same or different protocol 191. Advantageously, the CVM need not communicate any "liveness" information between itself and the computer nodes of the platform. There is no need for any CVM to track the status of nodes in the cluster. The CVM need only talk to a single node in the platform, which is then able to route requests to other nodes and public storage nodes.

The CVM also uses a memory cache 181 on the computer server 51. In communication with computer server 51 and with CVM 180 are also any number of solid-state disks (or other similar persistent storage) 195. These disks may be used as a data cache to also store data blocks that are written into storage platform 20. This cache may be used to rapidly retrieve data blocks instead of retrieving them from the remote storage platform.

CVM 180 handles different protocols by simulating an entity that the protocol would expect. For example, when communicating under the iSCSI block protocol, CVM responds to an iSCSI Initiation by behaving as an iSCSI Target. In other words, when virtual machine 186 performs I/O handling, it is the iSCSI Initiator and the controller virtual machine is the iSCSI Target. When an application is using the block protocol, the CVM masquerades as the iSCSI Target, traps the iSCSI CDBs, translates this information into its own protocol, and then communicates this information to the storage platform. Thus, when the CVM presents itself as an iSCSI Target, the application may simply talk to a block device as it would do normally.

Similarly, when communicating with an NFS client, the CVM behaves as an NFS server. When virtual machine 182 performs I/O handling the controller virtual machine is the NFS server and the NFS client (on behalf of virtual machine 182) executes either in the hypervisor of computer server 51 or in the operating system kernel of virtual machine 182. Thus, when an application is using the NFS protocol, the CVM masquerades as an NFS server, captures NFS packets, and then communicates this information to the storage platform using its own protocol.

An application is unaware that the CVM is trapping and intercepting its calls under the SCSI, NFS or other protocol, or that the CVM even exists. One advantage is that an application need not be changed in order to write to and read from the storage platform. Use of the CVM allows an application executing upon a virtual machine to continue using the protocol it expects, yet allows these applications on the various computer servers to write data to and read data from the same storage platform 20.

Replicas of a virtual disk may be stored within public cloud storage 190. As known in the art, public cloud storage refers to those data centers operated by enterprises that allow the public to store data for a fee. Included within these data centers are those known as Amazon Web Services and Google Compute. During a write request, the write request will include an identifier for each computer node to which a replica should be written. For example, nodes may be identified by their IP address. Thus, the computer node within the platform that first fields the write request from the CVM will then route the data to be written to nodes identified by their IP addresses. Any replica that should be sent to the public cloud can then simply be sent to the DNS name of a particular node which request (and data) is then routed to the appropriate public storage cloud. Any suitable computer router within the storage platform may handle this operation.

Provision Virtual Disk

Figure 4:
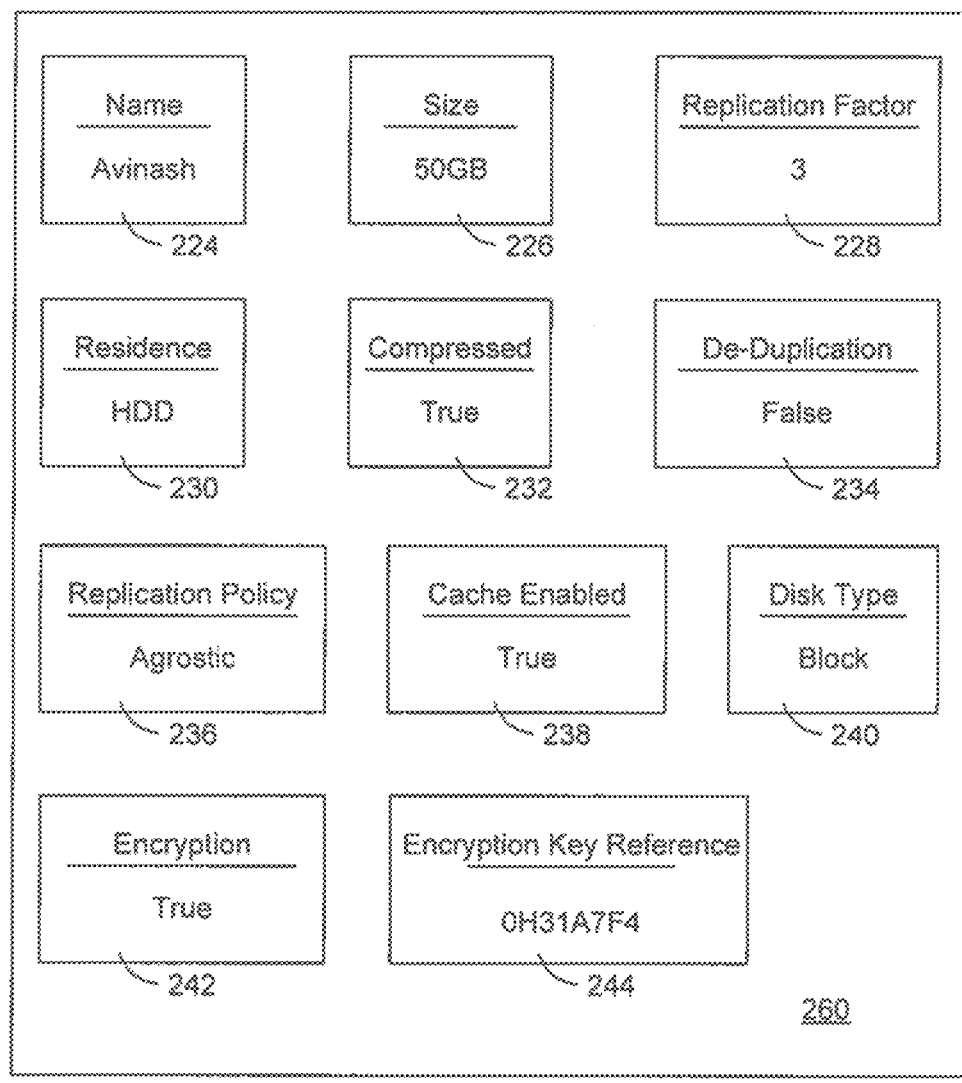
FIG. 4 illustrates a user interface window presented to an administrator in the course of creating and provisioning a virtual disk within the platform.

FIG. 4 illustrates a user interface window 220 presented to an administrator in the course of provisioning a virtual disk within platform 20. In this situation, the administrator is aware that a particular software application desires a virtual disk within the platform and is aware of the characteristics that the virtual disk should have. The administrator first uses the management console to access the platform and connect with the management console Web server on any one of the computer nodes within the platform. One of the characteristics for the virtual disk that may be chosen is whether or not the virtual disk should be de-duplicated. Applications that typically store unique data such as image files may not desire de-duplication (as de-duplication can add overhead), while applications that store text files (such as e-mail messages) may desire de-duplication. De-duplication, thus, is an optional feature that may be turned on or off for each virtual disk.

The administrator chooses the "Add Disk" option from within the management console routine and is presented with a window such as window 220 in order to choose the characteristics of the new virtual disk. For example, the administrator chooses: a name 224 for the new virtual disk; a size 226 for the virtual disk; a replication factor 228 (indicating how many replicas of the data should be stored within the platform); a residence 230 (indicating whether the data on the virtual disk should be stored on hard disk drives, on flash drives or on any other type of storage drive); compressed 232 (indicating whether the data on the virtual disk should be compressed or not); de-duplication 234 (indicating whether duplicates of the data should be saved to the virtual disk or not); a replication policy 236 (agnostic, data center aware, rack aware, or hybrid cloud aware); cache enabled 238 (a quality of service choice); disk type 240 (indicating whether the virtual disk is of a block type—the iSCSI protocol—or whether the virtual disk is of a file type—the NFS protocol); and encryption 242 (indicating whether or not the virtual disk will be or is encrypted). An encryption key reference 244 (a reference used to find the encryption key) may be created and added as described below in FIG. 6 if encryption 242 is chosen to be "true."

Once chosen, these characteristics are stored as "virtual disk information" 260 onto computer nodes within the storage platform. Preferably, this virtual disk information is replicated and stored on at least three different computer nodes. The metadata module 130 on these three computer nodes handles the storage of this information by placing it into persistent storage. In one embodiment, a hash function is used upon the virtual disk name 224 in order to produce a hash value which is then used to select three computer nodes within the platform. For example, the virtual disk information for the newly created virtual disk may be stored upon nodes 36, 30 and 40. In this fashion, the virtual disk metadata has been stored upon three metadata nodes within the platform (which might be different from the nodes where the actual data of the virtual disk will be stored).

The virtual disk that has been created is also attached to a virtual machine of the compute farm. In this step, the administrator is aware of which virtual machine on which computer of the compute farm needs the virtual disk. Thus, information regarding the newly created virtual disk (i.e., name, space available, etc.) is sent from the management console routine over link 189 to the appropriate computer within the compute farm. The information is provided to the controller virtual machine 180 which stores the information in cache 181, ready for use when the virtual machine needs to write or to read data. The administrator also supplies the name of the virtual disk to the application that will use it. At this time, no information need be sent from the storage platform or from the CVM to the application.

In addition, the identities of the metadata nodes which store this metadata for the virtual disk is also sent to the controller virtual machine for placing into cache 181. Thus, the controller virtual machine is aware of on which compute nodes of the storage platform the metadata for a particular virtual disk is stored.

Virtual Disks

Figure 5:
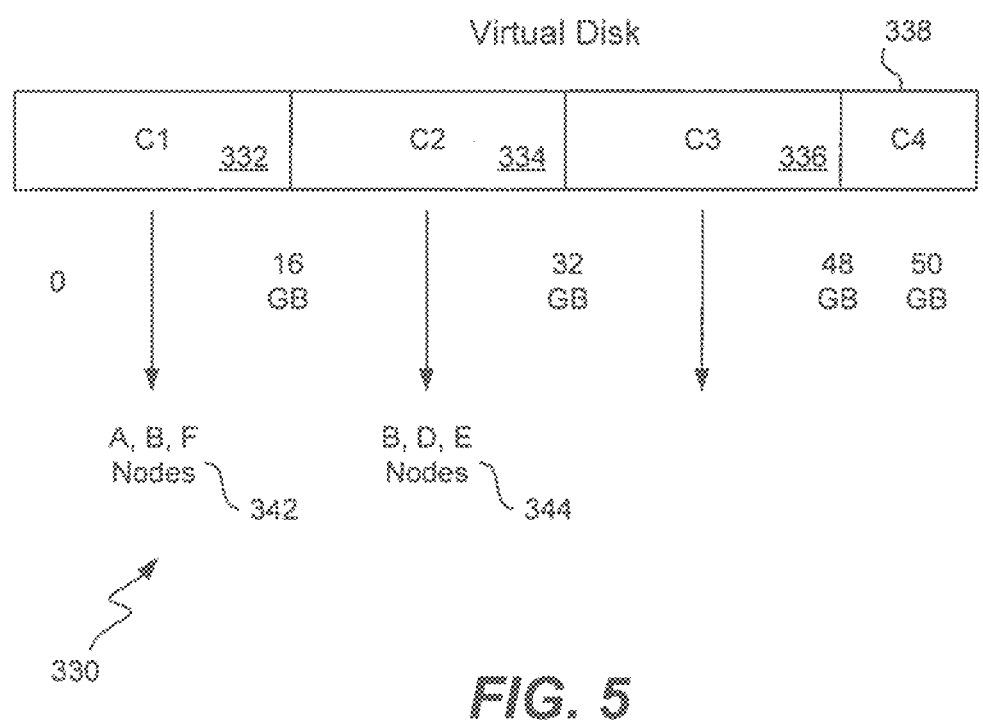
FIG. 5 is a symbolic representation of a virtual disk showing how data within the virtual disk is stored within the storage platform.

FIG. 5 is a symbolic representation of a virtual disk 330 showing how data within the virtual disk is stored within the storage platform. As shown, the virtual disk has been provisioned as a disk holding up to 50 GB, and the disk has been logically divided into segments or portions of 16 GB each. Each of these portions is termed a "container," and may range in size from about 4 GB up to about 32 GB, although a size of 16 GB works well. As shown, the first portion 332 is referred to as container one, or C1, while the latter portions 334-338 are referred to respectively as containers C2, C3 and C4. Note that the final container may have a size less than the sizes of the other containers. Containers have a particular naming convention. In one implementation, the convention is that the first container of a virtual disk will have a name that is the concatenation of: virtual disk name, "$" and "1." The second container of that virtual disk will have a nearly identical name except that the final symbol will be a "2." In this fashion, by knowing the container name, one knows with which virtual disk the container is associated. In addition, by knowing the virtual disk name, and an offset and size, one will be able to determine the names of the containers associated with a particular write request. In this fashion, each container name is unique within the entire storage platform.

Similar to a traditional hard disk, as data is written to the virtual disk the virtual disk will fill up symbolically from left to right, that is, first filling container C1 and then container C2, etc. Each container of data will be stored upon a particular node or nodes within the storage platform that are chosen during the write process. If no replication is chosen, then data within a particular container will be stored on one node, while if replication is two, for example, then data within that container will be stored upon two nodes. In the example of FIG. 5, the replication factor is three, thus, data stored within container 332 will be stored upon the three nodes A, B and F. Any data stored within the second container 334 will be stored upon the three nodes B, D and E. Note that the set of nodes 342 and 344 might be the same nodes, may be completely different nodes, or may have nodes in common.

It is possible that when a particular file (for example) is written from a virtual machine to a virtual disk on the storage platform that the file may be written to two different containers, meaning that the file could potentially be stored upon six different computer nodes if the replication factor is three. For example, if virtual disk 330 already contains 12 GB of data and an 8 GB file is to be written, then this file will span containers C1 and C2 because the division between the containers is at 16 GB. Thus, the first 4 GB of file will be written into the nodes designated for container C1, while the second 4 GB of the file will be written into the nodes designated for container C2. Note that this storage technique using containers is an implementation of the storage platform and is totally transparent to the virtual machines that are storing data. In this fashion, use of the containers spreads the storage of a virtual disk throughout many different computer nodes within the storage platform.

Key Management

Figure 6:
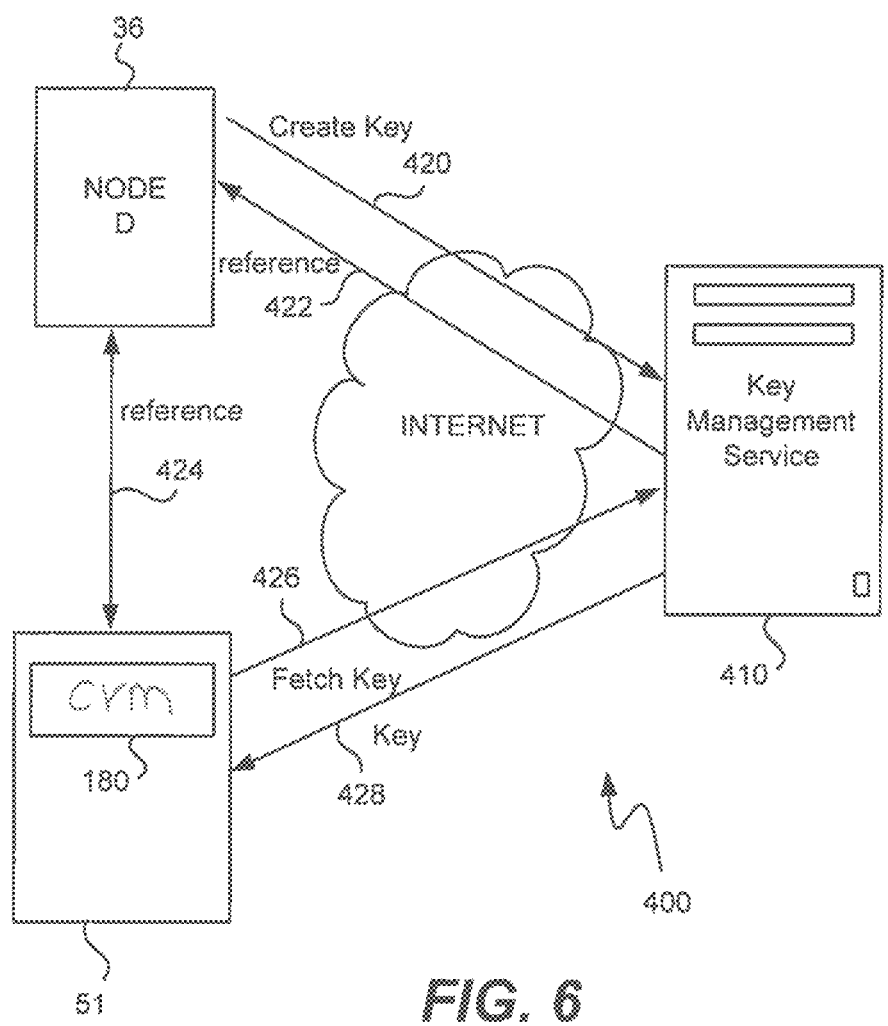
FIG. 6 is a block diagram of use of a key management service.

FIG. 6 illustrates a key management system 400 suitable for use by the present invention. Included are a computer 51, a node D 36 of the storage platform, a key management service 410 (KMS, e.g., any suitable service available from AWS, Barbican, SafeNet, etc.), and suitable connections over a wide-area network such as the Internet. As known in the art, a KMS will create an encryption key upon request from an application for use by the application for encryption/decryption. Typically, in response to a "create key" request 420 from an application, the KMS will create a new, unique encryption key for that application, store it securely within the KMS, and then deliver a unique reference 422 to that application (corresponding uniquely to the newly created key) so that the application may fetch the key at a later time. The node D may issue the request 420, the request may come from the storage platform, or from the management console routine of a node.

In one specific embodiment, an encryption key is created for a virtual disk when the disk is provisioned as described above and the administrator chooses encryption 242 to be "True." Accordingly, when encryption 242 is chosen to be "True," a "create key" request 420 is sent from the node 36 to the KMS 410; in return, the KMS creates an encryption key for the particular virtual disk, stores it, and returns reference 422. This reference is then stored at 244 and becomes part of the metadata for the newly created virtual disk. The reference is preferably returned to the node of the storage platform, but may also be returned to the management routine, or to another destination.

Once created, the key may be retrieved by that application (or by another) by issuing a "fetch key" request to the KMS and including in that request the original reference 422. The KMS will then locate the key in a database of its computer 410 using reference 422 and return the key 428 to the requesting application. In this example, the reference has been passed from node 36 to CVM 180 so that the CVM may obtain the key in order to encrypt or decrypt data. Of course, storage platform 20 may issue any number of "create key" requests for any number of virtual disks, and any CVM of a computer of the compute farm may be given a particular reference in order to obtain a key for a particular virtual disk of the platform.

In this embodiment, the "create" and "fetch" request are provided to the KMS using the API provided by that KMS, i.e., if the KMS used SafeNet, then the "create" and "fetch" requests are written in the language that the SafeNet API expects. In another embodiment, the storage platform 20 uses generic "create" and "fetch" requests that are translated into the specific format required by any suitable KMS, as will be described below.

Write Encrypted Data to Virtual Disk

Figure 7:
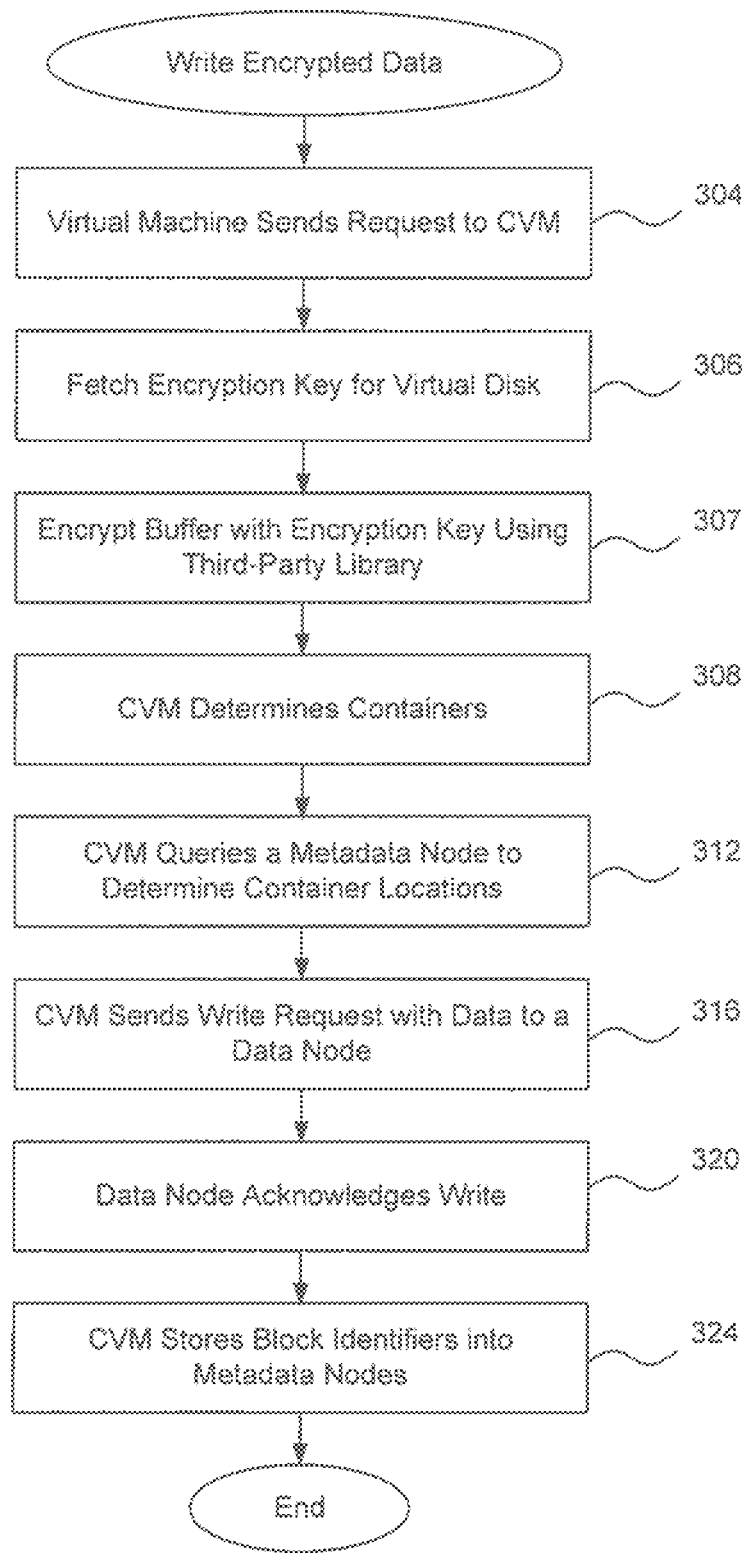
FIG. 7 is a flow diagram describing one embodiment by which a virtual machine writes encrypted data to the storage platform.

FIG. 7 is a flow diagram describing one embodiment by which a virtual machine writes encrypted data to the storage platform.

In step 304 an application of the virtual machine that desires to write data into the storage platform sends a write request along with the data to be written and the name of a particular virtual disk (supplied to the application by the administrator earlier). As mentioned, a write request may originate with any of the virtual machines on one of computers 50-52 and may use any of a variety of storage protocols. The write request typically takes the form: write (offset, size, virtual disk name). The parameter "virtual disk name" is the name of any virtual disk of the storage platform that has been provisioned earlier. The parameter "offset" is an offset within the virtual disk (i.e., a value from 0 up to the size of the virtual disk), and the parameter "size" is the size of the data to be written in bytes. Typically, the hypervisor of the computer where the virtual machine is running will intercept this request and send a buffer at a time of data to the CVM (a buffer being, for example, 4 k of data). The CVM then handles this write request sent by the application (in the block protocol, NFS protocol, or other suitable protocol used by the application). Preferably, the CVM checks the virtual disk metadata to determine if the data should be encrypted upon writing.

Figure 9:
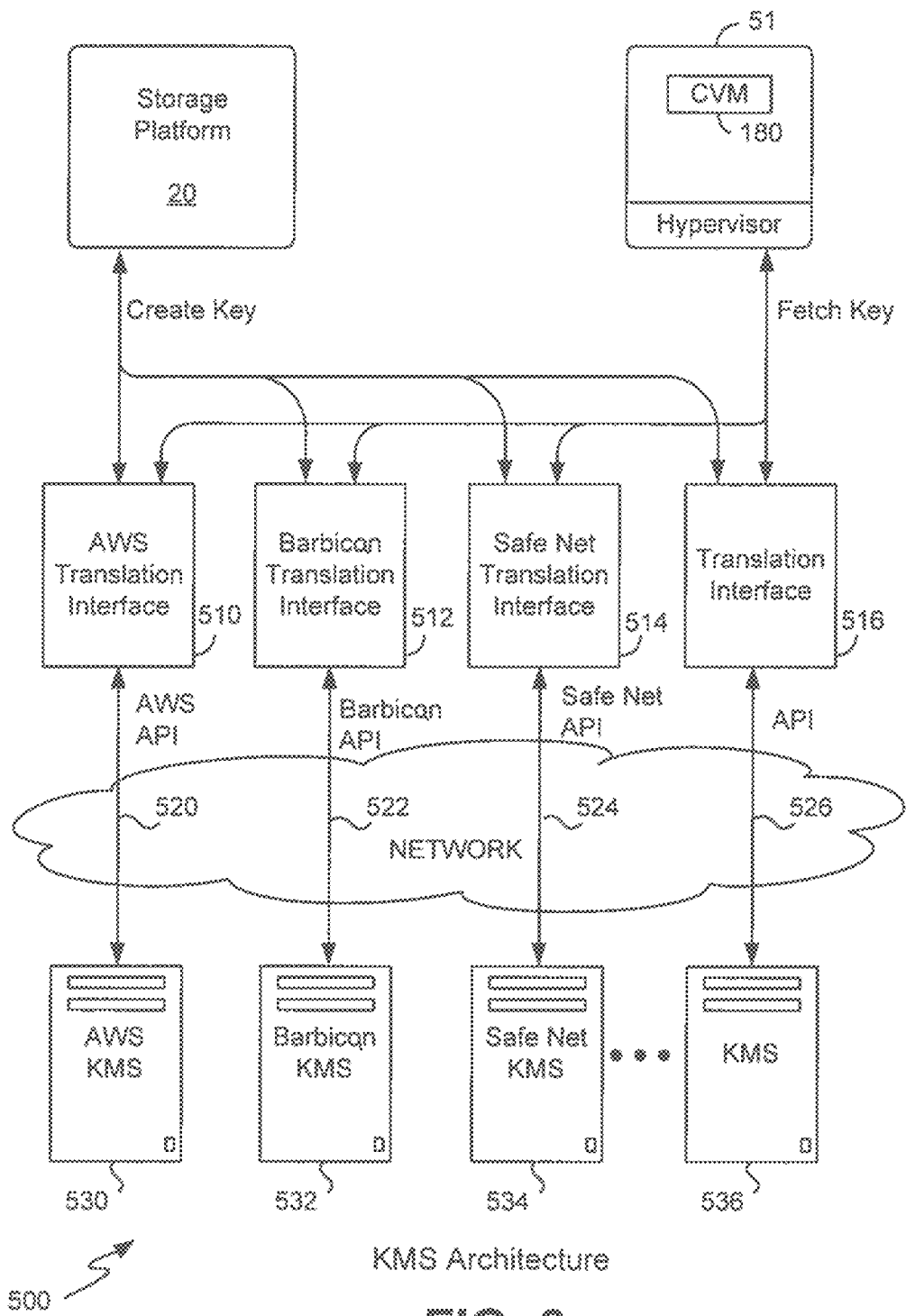
FIG. 9 is a block diagram of an architecture showing how the storage platform scales use of key management services.

Once the CVM receives the first buffer of the write request, in step 306 it retrieves the encryption key for this particular virtual disk. First, it queries the metadata node (e.g., node D 36) where metadata resides for the particular virtual disk in order to read the encryption key reference 244 from metadata 260. Next, it then sends a "fetch key" request 426 along with the reference 244 to the KMS; the KMS responds by sending back to the CVM the encryption key 428 corresponding to the virtual disk. Preferably, the key is not stored in persistent storage at the CVM computer nor in the storage platform; it is used by the CVM and then discarded. The key may be any suitable symmetric, asymmetric or other encryption key. If many KMSs are utilized by the storage platform (as shown in FIG. 9), then the underlying software (any of the modules of FIG. 2 of a node or CVM 180) is designed in a KMS vendor agnostic manner. The software will request the correct KMS for data as indicated by the user of the application.

Next, in step 307, the current buffer of data held by the CVM is encrypted using the key and calling a third-party encryption library using its encrypt API. By way of example, the open source libraries OpenSSL or Intel may be used. Preferably, the library is executing on the same computer as the CVM.

Next, in step 308 the controller virtual machine determines which containers to use for this request based upon the offset and size parameters. Assuming that only one container is needed (for example, C2), the CVM then proceeds to determine on which computer nodes of the storage platform the data should be stored.

In step 312 the CVM queries a metadata node (previously cached by the CVM) to determine on which computer nodes the container should be stored. If this is a first write request for a particular container, then the metadata node determines which and how many computer nodes to assign to that container based upon how many replicas are needed. Once the metadata node retrieves or determines the data nodes to use for the write request, it then returns a list to the CVM (e.g., it returns a list of nodes 344: B, D and E). The CVM is now ready to perform the write request.

In step 316 the CVM then sends the write request (in this case, the encrypted data itself to be written) to one of the data nodes returned in the previous step (e.g., data node E). The write request also includes an indication of the other two data nodes (B, D) to which the data should be written. The data node that receives the request then writes the data to its disk drives and then forwards the data to the other two nodes. Once each of these nodes writes the encrypted data to its disk drives, each of these nodes returns an acknowledgment back to the first data node that had originally received the request from the CVM.

The CVM also sends with the write request the relevant policies for the particular virtual disk. For example, the CVM indicates how many replicas are needed, the type of storage disk required, whether the data should be compressed, what the replication policy is, etc. The data node that receives the request will then handle implementations of all of these policies. Also in step 316, the CVM sends the current version of the virtual disk with the write request (the CVM cache 181 contains the current version and version tree for each virtual disk that is attached to it). The CVM may also write the same data blocks into solid-state storage 195 (a block cache) so that the data blocks may be read from this cache much more quickly if needed.

In step 320 this first data node (e.g., E) acknowledges that the write has occurred to the CVM and returns the names of the data nodes (e.g., B, D and E) where the encrypted data was written.

In step 324 the CVM then calculates the block identifiers (i.e., blocks 1, 2, 3) within the virtual disk where the encrypted data has been stored and then saves this information into the metadata nodes associated with the virtual disk. And, the locations of the containers (nodes and storage pools) are also written into the metadata modules associated with that virtual disk. And, the CVM also sends the current version of the virtual disk with the block identifiers so that the current version may be stored along with the block identifiers in the metadata nodes.

If more buffers of data remain as part of the original write request from the virtual machine, the CVM encrypts and writes this data as each buffer is received from the hypervisor as has been described above.

Read Encrypted Data from Virtual Disk

Figure 8:
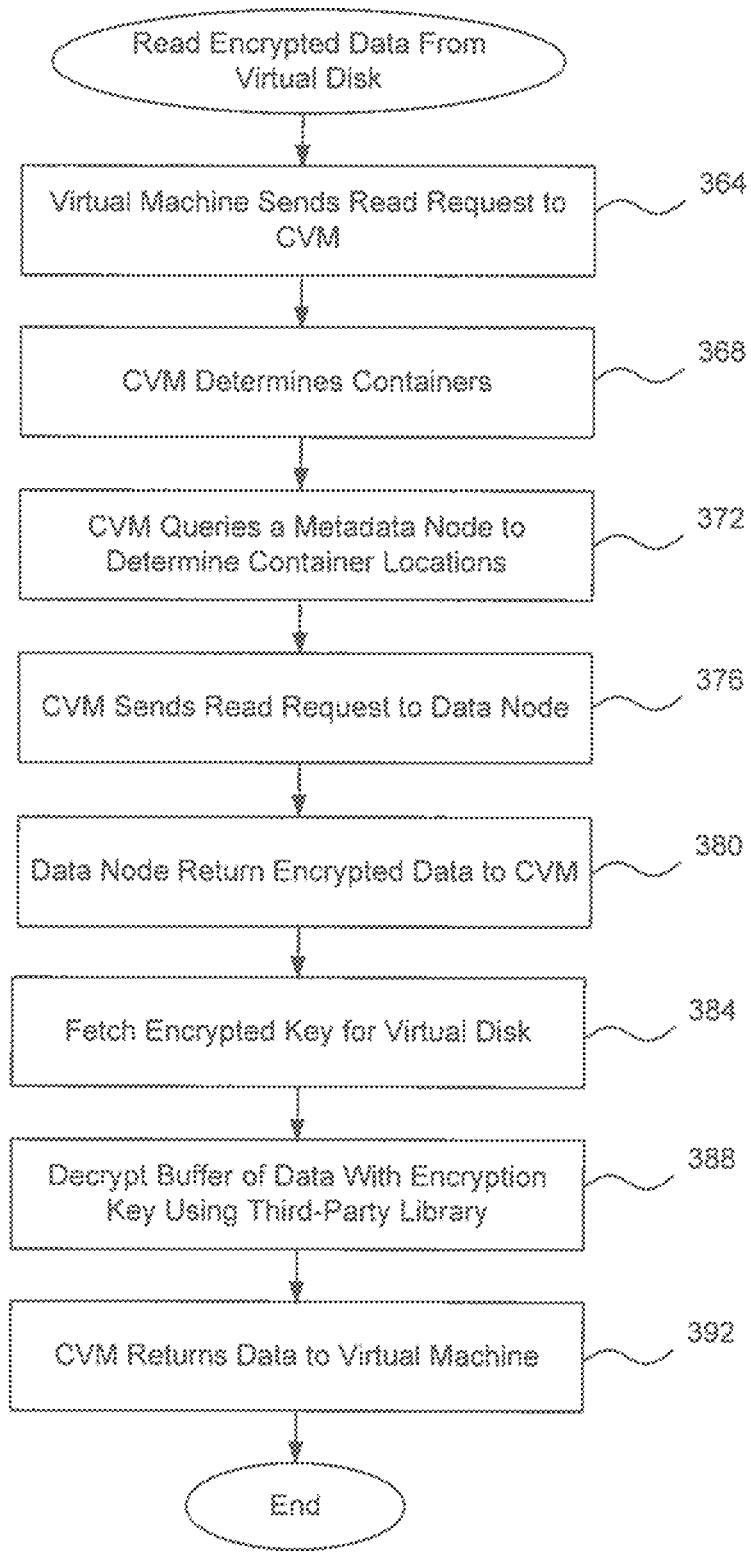
FIG. 8 is a flow diagram describing one embodiment by which a virtual machine reads encrypted data from the storage platform.

FIG. 8 is a flow diagram describing one embodiment by which a virtual machine reads encrypted data from the storage platform.

In step 364 the virtual machine that desires to read data from the storage platform sends a read request from a particular application to the desired virtual disk. As explained above, the controller virtual machine will then trap or capture the request (depending upon whether it is a block request or an NFS request) and then places a request into its own protocol before sending a request to the storage platform.

As mentioned, a read request may originate with any of the virtual machines on computer 51 (for example) and may use any of a variety of storage protocols. The read request typically takes the form: read (offset, size, virtual disk name). The parameter "virtual disk name" is the name of a virtual disk on the storage platform. The parameter "offset" is an offset within the virtual disk (i.e., a value from 0 up to the size of the virtual disk), and the parameter "size" is the size of the data to be read in bytes.

In one embodiment, the CVM first checks its block cache 195 to determine whether any of the blocks to be read are already present within this cache. If so, these blocks are retrieved from block cache 195 instead of having to establish a remote connection with storage platform 20 and retrieve those blocks remotely which would take a greater deal of time. If not present in the cache, the CVM will query the virtual disk metadata 260 in order to determine whether or not the data has been encrypted. Assuming that the virtual disk has been encrypted, the CVM will take steps as described below in order to decrypt the data that it reads.

Next, in step 368 the controller virtual machine determines which container or containers to read from for this request based upon the offset and size parameters as described above. The CVM also determines the block identifiers that it needs to read using the offset and the size from the request.

In step 372 the CVM queries a metadata node to determine on which computer nodes the data blocks identified by the block identifiers are written. The CVM sends a query with a container identifier (e.g., C2) and requests to return a list of the actual computer nodes on which the data had been written. Once the metadata node retrieves the data nodes where the data blocks were stored, it then returns a list to the CVM (e.g., it returns a list of these nodes 344: B, D and E). The CVM is now ready to perform the read request.

In step 376 the CVM then sends the read request to each of the data nodes returned in the previous step. The read request includes a list of block identifiers to be read and a timestamp from the previous successful write operation (in order to avoid reading the wrong data). Because every successful write operation records the timestamp of that successful write operation into the relevant metadata nodes, the CVM can obtain this timestamp for the last successful write operation.

In step 380 each data node returns the encrypted data identified by the block identifiers to the CVM. Alternatively, the read request is sent to only one of the data nodes (e.g., B) and also includes an indication of the other two data nodes (D, E) from which the data should be read. The first data node then passes the read request to each of the other data nodes. Each of these data nodes that receives the request then reads the data from its disk drives. Once each of these nodes reads the data from its disk drives, each of these nodes returns the data back to the first data node that had originally received the request from the CVM. This first data node then returns the data to the CVM. Preferably, once the data is received from the node, the CVM checks the virtual disk metadata to determine if the data should be decrypted. If "yes," it goes ahead and retrieves the encryption key and then decrypts the data received from the node.

Step 384 retrieves the encryption key for this particular virtual disk. First, the CVM queries the metadata node (e.g., node D 36) where metadata resides for the particular virtual disk in order to read the encryption key reference 244 from metadata 260. Next, it then sends a "fetch key" request 426 along with the reference 244 to the KMS; the KMS responds by sending back to the CVM the encryption key 428 corresponding to the virtual disk. Preferably, the key is not stored in persistent storage at the CVM computer nor in the storage platform; it is used by the CVM and then discarded. The key may be any suitable symmetric, asymmetric or other encryption key. If many KMSs are utilized by the storage platform (as shown in FIG. 9), then the underlying software (any of the modules of FIG. 2 of a node or CVM 180) is designed in a KMS vendor agnostic manner. The software will request the correct KMS for data as indicated by the user of the application.

Next, in step 388, a buffer of the encrypted data held by the CVM is decrypted using the key and calling a third-party decryption library using its decrypt API. By way of example, the open source libraries OpenSSL or Intel may be used. Typically, a read request of a length of data will fit entirely in a buffer. If not, additional calls to the decrypt API may be made a buffer of encrypted data at a time until all of the encrypted data has been decrypted. The CVM collects and temporarily stores the decrypted data until all of the read data has been decrypted.

Next, in step 392 the CVM then returns the decrypted data to the requesting virtual machine using the appropriate protocol 183 or 187, again masquerading either as a block device or as an NFS device depending upon the protocol used by the particular application.

Scalable Key Management

FIG. 9 illustrates a scalable key management service (KMS) architecture 500 that may be used in one embodiment of the invention. As mentioned earlier, the invention may be used with a single KMS or with multiple KMSs. In other words, the storage system 10 is able to use one of many KMSs. The invention is scalable in that the KMS architecture allows for any number of KMSs to be available, and also allows for new KMSs to be added in the future. Preferably, all virtual disks of a cluster use only one KMS. On setup and provisioning of a cluster, the administrator or user specifies which KMS should the virtual disks use if encryption is enabled.

Shown at 500 is the storage platform 20 and an example computer server 51 running a controller virtual machine (CVM), as well as any number of other virtual machines with respective software applications (not shown). Any number of KMS translation interfaces 510-516 each provide for a translation between the proprietary key management commands of platform 20, CVM 180 and a particular KMS API. The translation interfaces are preferably part of (and stored within) the code of one of the software modules of FIG. 2, such as pod module 140. They may also be stored in persistent storage of one of these nodes.

Initially, in order to check if a particular KMS is reachable, we invoke the following API: Boolean is Alive (KMSInfo kmsinfo). The translation interface then takes care of routing the request to the correct KMS. Example code of a translation interface that is used as an interface between the storage platform and an AWS KMS is shown below. In the case of AWS, this code checks whether the KMS is reachable. Other similar APIs are used in the translation interface in order to implement the "Create Key" and "Fetch Key" commands.

```
public boolean isAlive(KMSInfo kmsinfo) throws Exception
{
BasicAWSCredentials credentials = new
BasicAWSCredentials(username, password);
    kmsClient = new AWSKMSClient(credentials);
return (kmsClient !=null)? true:false;
}
```

In this example, each of the storage system-proprietary commands "create key" and "fetch key" are translated into the KMS-specific command that is expected by the KMS API. For example, these commands are translated into the commands expected by the AWS API. When the reference 422 is returned (after "create key") and when the key 428 is returned (after "fetch key"), the reference and the key pass through the translation interface; i.e., they are not modified by the translation interface, they are passed back "as is."

Also shown in FIG. 9 are specific KMSs 530-536 that are arranged to create encryption keys, store those keys, manage keys, and make those keys available for the storage system 10 (and for particular virtual disks) when requested as is known in the art. Also shown are communication links 520-526 over a suitable network such as the Internet that each communicate with a respective KMS 530-536 using the API commands required by that respective KMS, e.g., translation interface 512 communicates with Barbican KMS 532 using the API commands required by the Barbican KMS. As mentioned earlier, encryption keys are not stored permanently in the storage platform, and are only stored temporarily (i.e., in secured memory, not in persistent storage) by the CVM for use during encryption or decryption, and are then discarded. Preferably, the CVM discards the keys after use by initially overwriting the data with zeros and then deleting the memory holding this data.

Figure 10:
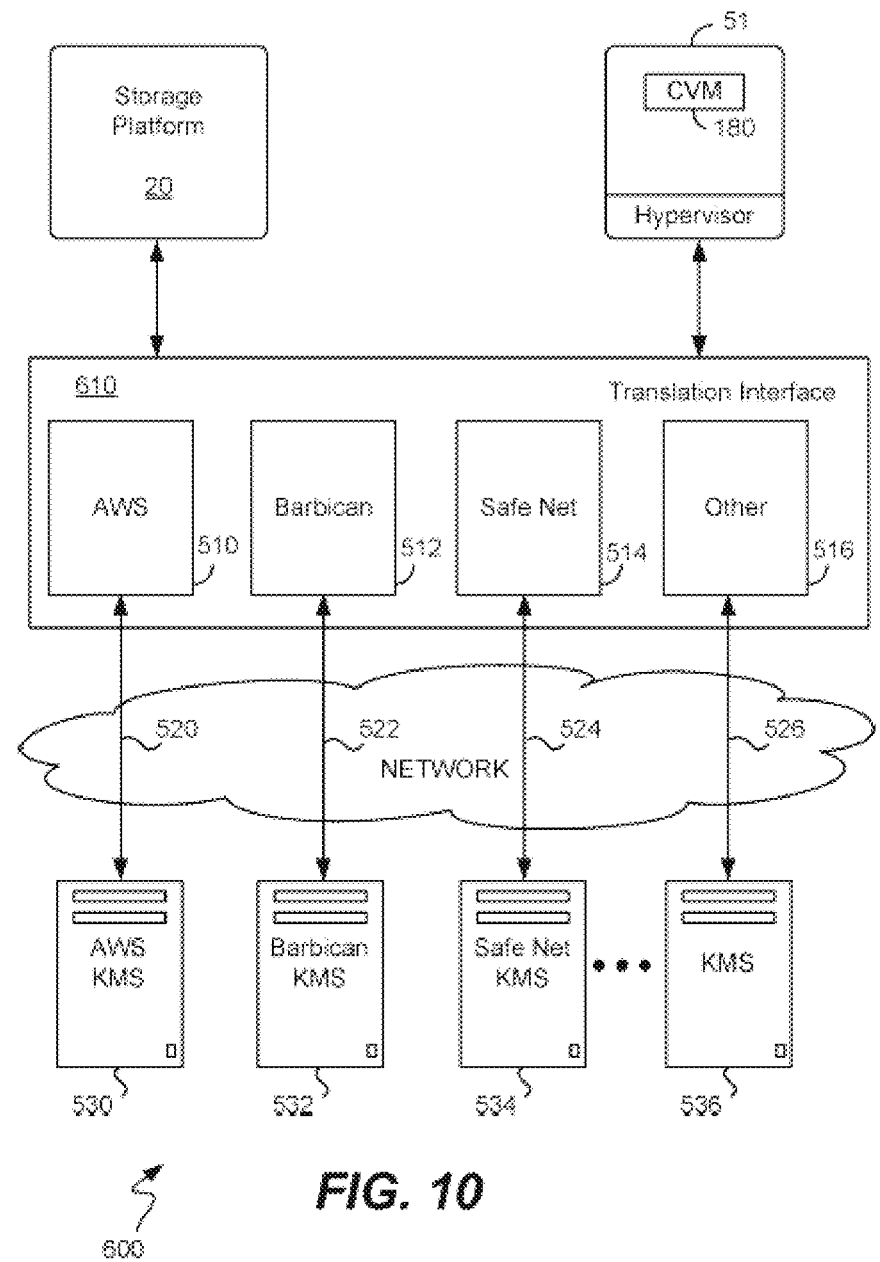
FIG. 10 illustrates a scalable key management service (KMS) architecture that may be used in another embodiment of the invention

FIG. 10 illustrates a scalable key management service (KMS) architecture 500 that may be used in another embodiment of the invention. In this embodiment, the translation interface 610 is basically one layer where all calls comes to (calls to Create Key or Fetch Key from platform 20 or CVM 180). These calls are then routed to the appropriate interface 510-516.

In this fashion, the storage service-proprietary commands may be used by any administrator, management console routine, node of the storage platform, CVM, etc., in a transparent manner without regard for the API-specific commands that a particular KMS might require, i.e., the invention provides a KMS-agnostic design. New KMSs may be added and current KMSs may be deleted, and the storage service-proprietary commands may continue to be used. The translation interfaces provide the buffer between the storage service-proprietary commands and the specific commands required by a specific KMS. When a new KMS is added, a new translation interface is also added in order to provide the translation between the commands "create key" and "fetch key" and the API-specific commands required by the new KMS. The invention is thus scalable to any number of KMSs without needing to change the software programming of the management console routine, node of the storage platform, CVM, etc.

De-Duplication of Data

The invention is also useful with a novel technique for de-duplication of data after the data has been encrypted. If we write ten bytes of data each having a value "A" into the storage platform each byte will have a unique block identifier ("blockID"). Based on its blockID, each "A" translates into a random value after encryption and these ten random values will be written into storage. This results in poor use of data storage.

But, we may perform de-duplication in a novel way. For example, assume encryption is enabled as described above. We then perform de-duplication in such a way, that, the ten bytes of "A" are detected initially and only one byte of "A" will become encrypted into a random value. We then write only one byte of encrypted "A" into the storage platform. The de-duplication logic recognizes that the single byte actually represents ten bytes, flags that blockID representing the one byte, and is thus able to read and decrypt the one byte into the ten bytes when needed. This results in good use of data storage.

Computer System Embodiment

Figure 11A:
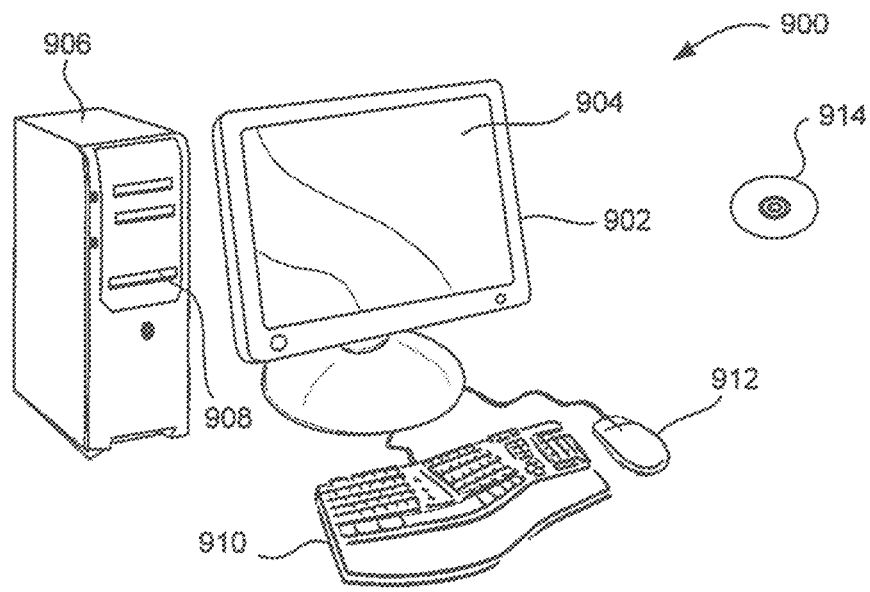
FIGS. 11A and 11B illustrate a computer system suitable for implementing embodiments of the present invention.
Figure 11B:
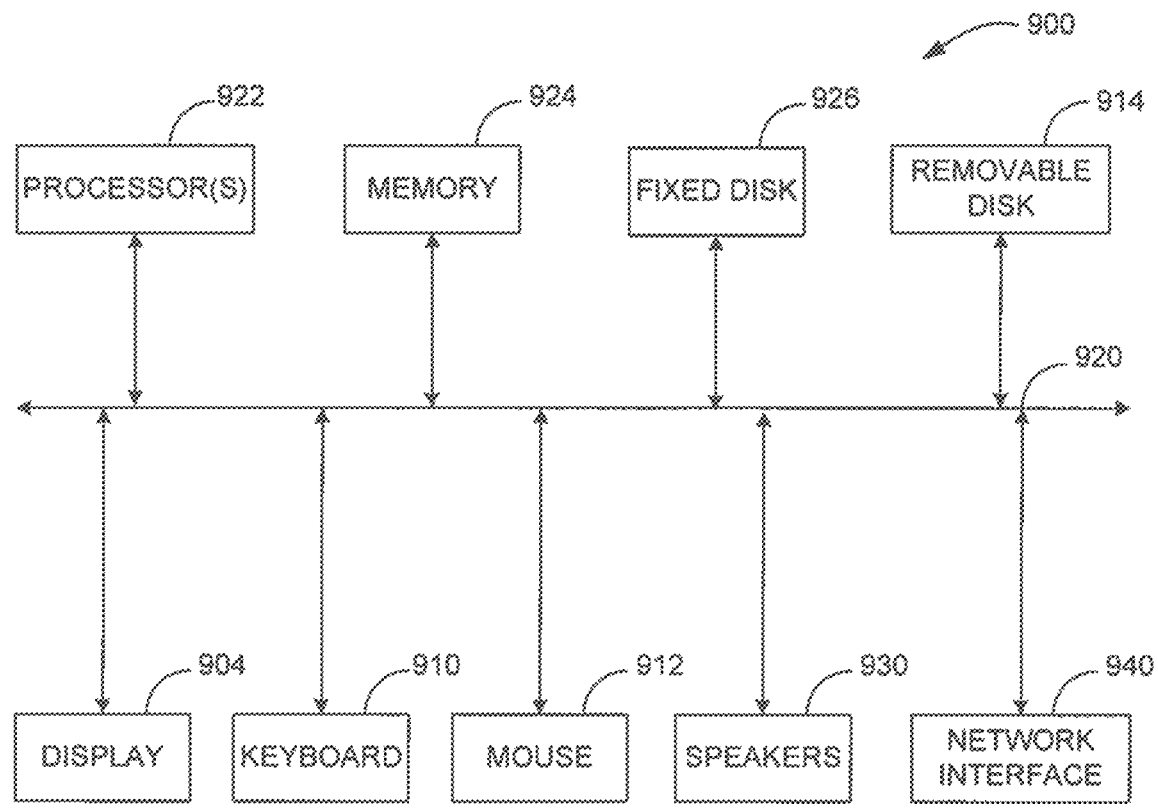

FIGS. 11A and 11B illustrate a computer system 900 suitable for implementing embodiments of the present invention. FIG. 11A shows one possible physical form of the computer system. Of course, the computer system may have many physical forms including an integrated circuit, a printed circuit board, a small handheld device (such as a mobile telephone or PDA), a personal computer or a supercomputer. Computer system 900 includes a monitor 902, a display 904, a housing 906, a disk drive 908, a keyboard 910 and a mouse 912. Disk 914 is a computer-readable medium used to transfer data to and from computer system 900.

FIG. 11B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

The invention claimed is:
1. A computer-implemented method comprising:
    intercepting, by a computer server, a first write request issued by a first application that executes at the computer server,
    wherein the first write request comprises first data to be written to a first virtual disk, wherein the first virtual disk is provisioned, at a distributed storage platform, as storage for the first application,
   wherein the computer server comprises one or more hardware processors, and
   wherein the computer server is distinct from, and communicatively coupled to, the distributed storage platform;
   generating encrypted first data by the computer server,
   wherein the encrypted first data is generated by encrypting the first data using an encryption key that corresponds to the first virtual disk;
   by the computer server, transmitting the encrypted first data to a first computer node of the distributed storage platform,
   wherein the distributed storage platform comprises computer nodes including the first computer node; and
   by the first computer node, routing the encrypted first data for storage on at least one of the computer nodes of the distributed storage platform, wherein the at least one of the computer nodes comprises one or more data storage devices.

2. The method of claim 1 wherein a controller virtual machine that executes at the computer server performs the intercepting, and further performs the generating of the encrypted first data.

3. The method of claim 1 wherein the first virtual disk is partitioned across a first plurality of the computer nodes of the distributed storage platform, and wherein the first computer node routes the encrypted first data for storage on at least one of the first plurality of the computer nodes.

4. The method of claim 1 wherein the first virtual disk is partitioned across a first plurality of the computer nodes of the distributed storage platform, and wherein the first computer node is one of the first plurality of the computer nodes, and wherein the first computer node: (i) stores the encrypted first data to a data storage device at the first computer node, and (ii) routes the encrypted first data for storage on at least one other computer node among the first plurality of the computer nodes according to a replication factor configured for the first virtual disk.

5. The method of claim 1 wherein the first virtual disk is partitioned across a first plurality of the computer nodes of the distributed storage platform, and wherein the first computer node is not among the first plurality of the computer nodes, and wherein the first computer node routes the encrypted first data for storage on at least one computer node among the first plurality of the computer nodes according to a replication factor configured for the first virtual disk.

6. The method of claim 1 wherein the first virtual disk is partitioned into a plurality of first storage containers across the distributed storage platform,
   wherein based on a replication factor, each first storage container among the plurality of first storage containers is replicated at multiple computer nodes of the distributed storage platform, and
   wherein the encrypted first data is stored in a given first storage container and is replicated according to the replication factor to one or more other first storage containers among the plurality of first storage containers.

7. The method of claim 1 wherein a wide-area network is interposed between the computer server and the distributed storage platform.

8. The method of claim 1 wherein the first data in the first write request is transmitted as the encrypted first data across a wide-area network that is interposed between the computer server and the distributed storage platform.

9. The method of claim 1 wherein a controller virtual machine that executes at the computer server is associated with the distributed storage platform; and
   wherein the controller virtual machine performs the intercepting of the first write request, the generating of the encrypted first data, and the transmitting of the encrypted first data to the first computer node.

10. The method of claim 1 wherein the encryption key is one or more of: retrieved from a key management service (KMS), and is not stored on the distributed storage platform.

11. A computer-implemented method comprising:
   intercepting, by a computer server, a first read request issued by a first application that executes at the computer server,
   wherein the first read request references first data that is stored in a first virtual disk,
   wherein the first virtual disk is provisioned at a distributed storage platform as storage for the first application,
   wherein the computer server comprises one or more hardware processors, and
   wherein the computer server is distinct from, and communicatively coupled to, the distributed storage platform;
   by the computer server, transmitting the first read request to a first computer node of the distributed storage platform,
   wherein the distributed storage platform comprises computer nodes including the first computer node;
   by the first computer node, routing the first read request to at least one of the computer nodes of the distributed storage platform,
   wherein the first data is stored in encrypted form, as encrypted first data, in the at least one of the computer nodes of the distributed storage platform;
   by the computer server, receiving the encrypted first data from one or more of:
   the first computer node and a second computer node among the at least one of the computer nodes of the distributed storage platform;
   by the computer server using an encryption key that corresponds to the first virtual disk, decrypting the encrypted first data into decrypted first data; and
   by the computer server, transmitting the decrypted first data to the first application in response to the first read request.

12. The method of claim 11 wherein a controller virtual machine that executes at the computer server performs the intercepting, the decrypting of the encrypted first data, and the transmitting of the decrypted first data to the first application.

13. The method of claim 11 wherein the first virtual disk is partitioned across a first plurality of the computer nodes of the distributed storage platform, and wherein the first computer node routes the first read request to at least one of the first plurality of the computer nodes.

14. The method of claim 11 wherein the first virtual disk is partitioned across a first plurality of the computer nodes of the distributed storage platform, and wherein the first computer node is one of the first plurality of the computer nodes, and wherein the first computer node one or more of: (i) reads the encrypted first data from a storage device at the first computer node, and (ii) routes the first read request to at least one other computer node among the first plurality of the computer nodes.

15. The method of claim 11 wherein the first virtual disk is partitioned across a first plurality of the computer nodes of the distributed storage platform, and wherein the first computer node is not one of the first plurality of the computer nodes, and wherein the first computer node routes the first read request to at least one computer node among the first plurality of the computer nodes.

16. The method of claim 11 wherein the first virtual disk is partitioned into a plurality of first storage containers across the distributed storage platform,
- wherein based on a replication factor, each first storage container among the plurality of first storage containers is replicated at multiple computer nodes of the distributed storage platform, and
- wherein the encrypted first data is stored in a given first storage container and is replicated according to the replication factor to one or more other first storage containers among the plurality of first storage containers.

17. The method of claim 11 wherein the first data referenced in the first read request is transmitted in encrypted form from the distributed storage platform to the computer server.

18. The method of claim 11 wherein the first data referenced in the first read request is transmitted in encrypted form across a wide-area network that is interposed between the distributed storage platform and the computer server.

19. The method of claim 11 wherein a controller virtual machine that executes at the computer server is associated with the distributed storage platform; and
- wherein the controller virtual machine performs the intercepting of the first read request, the receiving of the encrypted first data, and the decrypting of the encrypted first data into the decrypted first data.

20. The method of claim 11 wherein the encryption key is one or more of: retrieved from a key management service (KMS), and is not stored on the distributed storage platform.

* * * * *